United States Patent
Yang et al.

(10) Patent No.: US 8,301,976 B1
(45) Date of Patent: Oct. 30, 2012

(54) DEFECT DETECTOR FOR HOLOGRAPHIC STORAGE SYSTEMS

(75) Inventors: Shaohua Yang, San Jose, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 1337 days.

(21) Appl. No.: 11/954,823

(22) Filed: Dec. 12, 2007

Related U.S. Application Data

(60) Provisional application No. 60/870,256, filed on Dec. 15, 2006.

(51) Int. Cl.
*G06F 11/00* (2006.01)

(52) U.S. Cl. ........ 714/763; 714/758; 714/780; 714/794; 360/53; 375/341; 375/343

(58) Field of Classification Search ........................ None
See application file for complete search history.

(56) References Cited

U.S. PATENT DOCUMENTS

| | | | | |
|---|---|---|---|---|
| 5,493,454 A | * | 2/1996 | Ziperovich et al. | 360/45 |
| 6,460,150 B1 | * | 10/2002 | Cideciyan et al. | 714/709 |
| 8,054,717 B1 | * | 11/2011 | Yang et al. | 369/47.14 |
| 2005/0190868 A1 | * | 9/2005 | Khandekar et al. | 375/346 |

* cited by examiner

*Primary Examiner* — Scott Baderman
*Assistant Examiner* — Jason Bryan

(57) ABSTRACT

A system including a data detection module, a reconstruction filter module, a first correlation module, and a second correlation module. The data detection module detects data bits from input signals. The reconstruction filter module generates reconstructed signals using the data bits. The first correlation module correlates the input signals and the reconstructed signals and generates first correlation values. The second correlation module self-correlates the reconstructed signals and generates second correlation values. In response to at least one of the input signals and the reconstructed signals including a B-bit floating number having a sign bit, at least one of the first correlation module and the second correlation module generates the first correlation values and the second correlation values based on the sign bit and K most significant bits (MSBs) of the B-bit floating number, where $0 < K < (B-1)$, and B is an integer greater than 1.

17 Claims, 12 Drawing Sheets

DEFECT DETECTOR FOR HOLOGRAPHIC STORAGE SYSTEMS

CROSS-REFERENCE TO RELATED APPLICATIONS

This application claims the benefit of U.S. Provisional Application No. 60/870,256, filed on Dec. 15, 2006. The disclosure of the above application is incorporated herein by reference in its entirety.

FIELD

The present disclosure relates to holographic storage systems, and more particularly to detecting data errors due to defects in holographic storage media.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Holographic storage systems provide high-capacity nonvolatile data storage. In holographic storage systems, a source of monochromatic coherent radiation is split into an object beam and a reference beam. The object beam is spatially modulated by a data source that provides data to be stored on a holographic storage medium (medium). The reference beam is unmodulated. During write operations, the object and reference beams are directed onto a region of the medium. The object and reference beams interact to generate an interference pattern called a hologram. The medium is made of a light sensitive material that records the hologram.

During read operations, the medium is illuminated by a read beam having characteristics of the reference beam. An image sensor converts light signals received from the medium into read back signals. An image of the recorded hologram can be constructed from the read back signals.

Referring now to FIG. 1, a functional block diagram of a holographic storage system is 10 is shown. The holographic storage system 10 comprises a medium 12, a drive apparatus 14, a laser unit 15, an optical pickup unit (e.g., an image sensor) 16, a write module 18, a read module 20, a control module 22, and a host interface 24.

The control module 22 controls the drive apparatus 14. The drive apparatus 14 drives the medium 12. The drive apparatus 14 controls positioning of the laser unit 15 and the image sensor 16 relative to the medium 12 during read/write operations. The laser unit 15 generates laser beams (e.g., the object, reference, and read beams) for writing and reading data on the medium 12. The image sensor 16 senses images stored on the medium 12 and generates read back signals.

The write module 18 includes encoders (not shown) that encode data and modulators (not shown) that modulate the encoded data. The write module 18 generates write signals that are input to the laser unit 15. The laser unit 15 writes data on the medium 12 based on the write signals. The read module 20 receives read back signals from the image sensor 16. The read module 20 includes demodulators (not shown) that demodulate the data and decoders (not shown) that decode the demodulated data.

The control module 22 communicates with a host (not shown) via the host interface 24. The control module 22 receives data from the host that is to be written on the medium 12 and inputs the data to the write module 18. When the host requests data from the medium 12, the control module 22 returns the data read by the read module 20 from the medium 12 to the host.

Over time, the medium 12 may deteriorate due to repeated read/write operations and develop defects. Additionally, the medium 12 may develop defects due to scratches, dust, etc. The defects are called media defects. Media defects can adversely affect characteristics (e.g., amplitude) of the read back signals. Consequently, the data read back from the medium 12 may not accurately represent the data written on the medium 12.

SUMMARY

A system comprises a data detection module, a reconstruction filter module, and a first correlation module. The data detection module receives input signals, detects data bits from the input signals, and generates detected data bits. The reconstruction filter module generates reconstructed signals using the detected data bits. The first correlation module correlates the input signals and the reconstructed signals and generates first correlation values.

In another feature, the system further comprises a second correlation module that self-correlates the reconstructed signals and that generates second correlation values.

In another feature, the system further comprises first and second moving average filters and a comparing module. The first and second moving average filters generate first and second filter values based on the first and second correlation values, respectively. The comparing module compares the first and second filter values, generates first control signals when a difference between the first and second filter values is less than or equal to a predetermined threshold, and generates second control signals when the difference is greater than the predetermined threshold. The system further comprises a decoder module that decodes the detected data bits based on at least one of the first and second control signals.

In another feature, the data detection module generates log-likelihood ratios (LLRs) that indicate reliability of the detected data bits. The system further comprises a decoder module that decodes the detected data bits based on the LLRs.

In another feature, a read module of a holographic storage system comprises the system, wherein the read module receives the input signals from a holographic storage medium, and wherein the control signals indicate errors in the data bits due to defects of the holographic storage medium.

In another feature, an analog front-end module of a digital versatile disc (DVD) storage system comprises the system, wherein the analog front-end module receives the input signals from a DVD, and wherein the control signals indicate errors in the data bits due to defects of the DVD.

In another feature, a digital signal processor (DSP) of a digital versatile disc (DVD) storage system comprises the system, wherein the DSP module receives the input signals from a DVD, and wherein the control signals indicate errors in the data bits due to defects of the DVD.

In another feature, a read channel of a hard disk drive (HDD) comprises the system, wherein the read channel receives the input signals from a magnetic medium of the HDD, and wherein the control signals indicate errors in the data bits due to defects of the magnetic medium.

In another feature, when at least one of the input and reconstructed signals includes a B-bit floating number having a sign bit, at least one of the first and second correlation modules generates the first and second correlation values based on the sign bit and K most significant bits (MSBs) of the floating number, wherein $0 \leq K \leq (B-1)$, and wherein B is an integer greater than 1.

In still other features, a system comprises a data detection module, a reconstruction filter module, and an absolute value module. The data detection module receives input signals, detects data bits from the input signals, and generates detected data bits. The reconstruction filter module generates reconstructed signals using the detected data bits. The absolute value module generates absolute values of the reconstructed signals.

In another feature, the system further comprises a sign multiplication module that multiplies the input signals by signs of the reconstructed signals and that generates first outputs.

In another feature, the system further comprises first and second moving average filters and a comparing module. The first and second moving average filters generate first and second filter values based on the first outputs and the absolute values, respectively. The comparing module compares the first and second filter values, generates first control signals when a difference between the first and second filter values is less than or equal to a predetermined threshold, and generates second control signals when the difference is greater than the predetermined threshold. The system further comprises a decoder module that decodes the detected data bits based on at least one of the first and second control signals.

In another feature, the data detection module generates log-likelihood ratios (LLRs) that indicate reliability of the detected data bits. The system further comprises a decoder module that decodes the detected data bits based on the LLRs.

In another feature, a read module of a holographic storage system comprises the system, wherein the read module receives the input signals from a holographic storage medium, and wherein the control signals indicate errors in the data bits due to defects of the holographic storage medium.

In another feature, an analog front-end module of a digital versatile disc (DVD) storage system comprises the system, wherein the analog front-end module receives the input signals from a DVD, and wherein the control signals indicate errors in the data bits due to defects of the DVD.

In another feature, a digital signal processor (DSP) of a digital versatile disc (DVD) storage system comprises the system, wherein the DSP module receives the input signals from a DVD, and wherein the control signals indicate errors in the data bits due to defects of the DVD.

In another feature, a read channel of a hard disk drive (HDD) comprises the system, wherein the read channel receives the input signals from a magnetic medium of the HDD, and wherein the control signals indicate errors in the data bits due to defects of the magnetic medium.

In still other features, a method comprises receiving input signals and generating detected data bits by detecting data bits from the input signals. The method further comprises generating reconstructed signals using the detected data bits. The method further comprises generating first correlation values by correlating the input signals and the reconstructed signals.

In another feature, the method further comprises generating second correlation values by self-correlating the reconstructed signals.

In another feature, the method further comprises generating first and second moving average filter values based on the first and second correlation values, respectively. The method further comprises comparing the first and second moving average filter values, generating first control signals when a difference between the first and second moving average filter values is less than or equal to a predetermined threshold, and generating second control signals when the difference is greater than the predetermined threshold. The method further comprises decoding the detected data bits based on at least one of the first and second control signals.

In another feature, the method further comprises generating log-likelihood ratios (LLRs) and indicating reliability of the detected data bits. The method further comprises decoding the detected data bits based on the LLRs.

In another feature, the method further comprises receiving the input signals from a holographic storage medium, wherein the control signals indicate errors in the data bits due to defects of the holographic storage medium.

In another feature, the method further comprises receiving the input signals from a DVD, wherein the control signals indicate errors in the data bits due to defects of the DVD.

In another feature, the method further comprises receiving the input signals from a magnetic medium of a hard disk drive (HOD), wherein the control signals indicate errors in the data bits due to defects of the magnetic medium.

In another feature, the method further comprises generating at least one of the first and second correlation values based on a sign bit and K most significant bits (MSBs) of a floating number when at least one of the input and reconstructed signals includes the floating number having B bits and the sign bit, wherein $0 \leq K \leq (B-1)$, and wherein B is an integer greater than 1.

In still other features, a method comprises receiving input signals and generating detected data bits by detecting data bits from the input signals. The method further comprises generating reconstructed signals using the detected data bits. The method further comprises generating absolute values of the reconstructed signals.

In another feature, the method further comprises generating first outputs by multiplying the input signals by signs of the reconstructed signals.

In another feature, the method further comprises generating first and second moving average filter values based on the first outputs and the absolute values, respectively. The method further comprises comparing the first and second moving average filter values, generating first control signals when a difference between the first and second moving average filter values is less than or equal to a predetermined threshold, and generating second control signals when the difference is greater than the predetermined threshold. The method further comprises decoding the detected data bits based on at least one of the first and second control signals.

In another feature, the method further comprises generating log-likelihood ratios (LLRs) and indicating reliability of the detected data bits. The method further comprises decoding the detected data bits based on the LLRs.

In another feature, the method further comprises receiving the input signals from a holographic storage medium, wherein the control signals indicate errors in the data bits due to defects of the holographic storage medium.

In another feature, the method further comprises receiving the input signals from a DVD, wherein the control signals indicate errors in the data bits due to defects of the DVD.

In another feature, the method further comprises receiving the input signals from a magnetic medium of a hard disk drive (HDD), wherein the control signals indicate errors in the data bits due to defects of the magnetic medium.

In still other features, a system comprises data detection means for receiving input signals, detecting data bits from the input signals, and generating detected data bits. The system further comprises reconstruction filter means for generating reconstructed signals using the detected data bits. The system further comprises first correlation means for correlating the input signals and the reconstructed signals and generating first correlation values.

In another feature, the system further comprises second correlation means for self-correlating the reconstructed signals and generating second correlation values.

In another feature, the system further comprises first and second moving average filter means for generating first and second filter values based on the first and second correlation values, respectively. The system further comprises comparing means for comparing the first and second filter values, generating first control signals when a difference between the first and second filter values is less than or equal to a predetermined threshold, and generating second control signals when the difference is greater than the predetermined threshold. The system further comprises decoder means for decoding the detected data bits based on at least one of the first and second control signals.

In another feature, the data detection means generates log-likelihood ratios (LLRs) that indicate reliability of the detected data bits. The system further comprises decoder means for decoding the detected data bits based on the LLRs.

In another feature, a read module of a holographic storage system comprises the system, wherein the read module receives the input signals from a holographic storage medium, and wherein the control signals indicate errors in the data bits due to defects of the holographic storage medium.

In another feature, an analog front-end module of a digital versatile disc (DVD) storage system comprises the system, wherein the analog front-end module receives the input signals from a DVD, and wherein the control signals indicate errors in the data bits due to defects of the DVD.

In another feature, a digital signal processor (DSP) of a digital versatile disc (DVD) storage system comprises the system, wherein the DSP module receives the input signals from a DVD, and wherein the control signals indicate errors in the data bits due to defects of the DVD.

In another feature, a read channel of a hard disk drive (HDD) comprises the system, wherein the read channel receives the input signals from a magnetic medium of the HDD, and wherein the control signals indicate errors in the data bits due to defects of the magnetic medium.

In another feature, when at least one of the input and reconstructed signals includes a B-bit floating number having a sign bit, at least one of the first and second correlation means generates the first and second correlation values based on the sign bit and K most significant bits (MSBs) of the floating number, wherein $0 \leq K \leq (B-1)$, and wherein B is an integer greater than 1.

In still other features, a system comprises data detection means for receiving input signals, detecting data bits from the input signals, and generating detected data bits. The system further comprises reconstruction filter means for generating reconstructed signals using the detected data bits. The system further comprises absolute value means for generates absolute values of the reconstructed signals.

In another feature, the system further comprises sign multiplication means for multiplying the input signals by signs of the reconstructed signals and generating first outputs.

In another feature, the system further comprises first and second moving average filter means for generating first and second filter values based on the first outputs and the absolute values, respectively. The system further comprises comparing means for comparing the first and second filter values, generating first control signals when a difference between the first and second filter values is less than or equal to a predetermined threshold, and generating second control signals when the difference is greater than the predetermined threshold. The system further comprises decoder means for decoding the detected data bits based on at least one of the first and second control signals.

In another feature, the data detection means generates log-likelihood ratios (LLRs) that indicate reliability of the detected data bits. The system further comprises decoder means for decoding the detected data bits based on the LLRs.

In another feature, a read module of a holographic storage system comprises the system, wherein the read module receives the input signals from a holographic storage medium, and wherein the control signals indicate errors in the data bits due to defects of the holographic storage medium.

In another feature, an analog front-end module of a digital versatile disc (DVD) storage system comprises the system, wherein the analog front-end module receives the input signals from a DVD, and wherein the control signals indicate errors in the data bits due to defects of the DVD.

In another feature, a digital signal processor (DSP) of a digital versatile disc (DVD) storage system comprises the system, wherein the DSP module receives the input signals from a DVD, and wherein the control signals indicate errors in the data bits due to defects of the DVD.

In another feature, a read channel of a hard disk drive (HDD) comprises the system, wherein the read channel receives the input signals from a magnetic medium of the HDD, and wherein the control signals indicate errors in the data bits due to defects of the magnetic medium.

In still other features, a computer program executed by a processor comprises receiving input signals and generating detected data bits by detecting data bits from the input signals. The computer program further comprises generating reconstructed signals using the detected data bits. The computer program further comprises generating first correlation values by correlating the input signals and the reconstructed signals.

In another feature, the computer program further comprises generating second correlation values by self-correlating the reconstructed signals.

In another feature, the computer program further comprises generating first and second moving average filter values based on the first and second correlation values, respectively. The computer program further comprises comparing the first and second moving average filter values, generating first control signals when a difference between the first and second moving average filter values is less than or equal to a predetermined threshold, and generating second control signals when the difference is greater than the predetermined threshold. The computer program further comprises decoding the detected data bits based on at least one of the first and second control signals.

In another feature, the computer program further comprises generating log-likelihood ratios (LLRs) and indicating reliability of the detected data bits. The computer program further comprises decoding the detected data bits based on the LLRs.

In another feature, the computer program further comprises receiving the input signals from a holographic storage medium, wherein the control signals indicate errors in the data bits due to defects of the holographic storage medium.

In another feature, the computer program further comprises receiving the input signals from a DVD, wherein the control signals indicate errors in the data bits due to defects of the DVD.

In another feature, the computer program further comprises receiving the input signals from a magnetic medium of a hard disk drive (HDD), wherein the control signals indicate errors in the data bits due to defects of the magnetic medium.

In another feature, the computer program further comprises generating at least one of the first and second correlation values based on a sign bit and K most significant bits (MSBs) of a floating number when at least one of the input and reconstructed signals includes the floating number having B bits and the sign bit, wherein $0 \leq K \leq (B-1)$, and wherein B is an integer greater than 1.

In still other features, a computer program comprises receiving input signals and generating detected data bits by detecting data bits from the input signals. The computer program further comprises generating reconstructed signals using the detected data bits. The computer program further comprises generating absolute values of the reconstructed signals.

In another feature, the computer program further comprises generating first outputs by multiplying the input signals by signs of the reconstructed signals.

In another feature, the computer program further comprises generating first and second moving average filter values based on the first outputs and the absolute values, respectively. The computer program further comprises comparing the first and second moving average filter values, generating first control signals when a difference between the first and second moving average filter values is less than or equal to a predetermined threshold, and generating second control signals when the difference is greater than the predetermined threshold. The computer program further comprises decoding the detected data bits based on at least one of the first and second control signals.

In another feature, the computer program further comprises generating log-likelihood ratios (LLRs) and indicating reliability of the detected data bits. The computer program further comprises decoding the detected data bits based on the LLRs.

In another feature, the computer program further comprises receiving the input signals from a holographic storage medium, wherein the control signals indicate errors in the data bits due to defects of the holographic storage medium.

In another feature, the computer program further comprises receiving the input signals from a DVD, wherein the control signals indicate errors in the data bits due to defects of the DVD.

In another feature, the computer program further comprises receiving the input signals from a magnetic medium of a hard disk drive (HDD), wherein the control signals indicate errors in the data bits due to defects of the magnetic medium.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
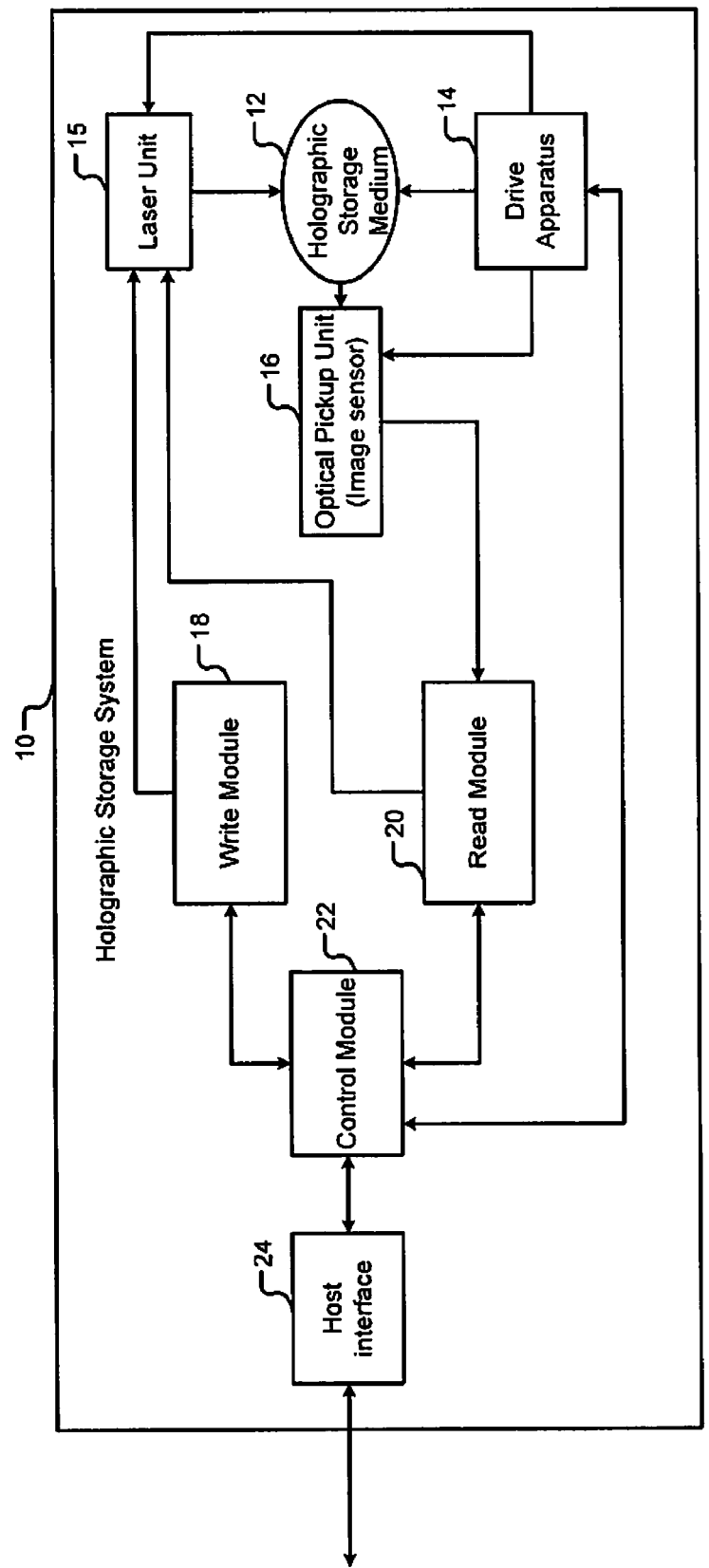
FIG. 1 is a functional block diagram of a holographic storage system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

Figure 2:
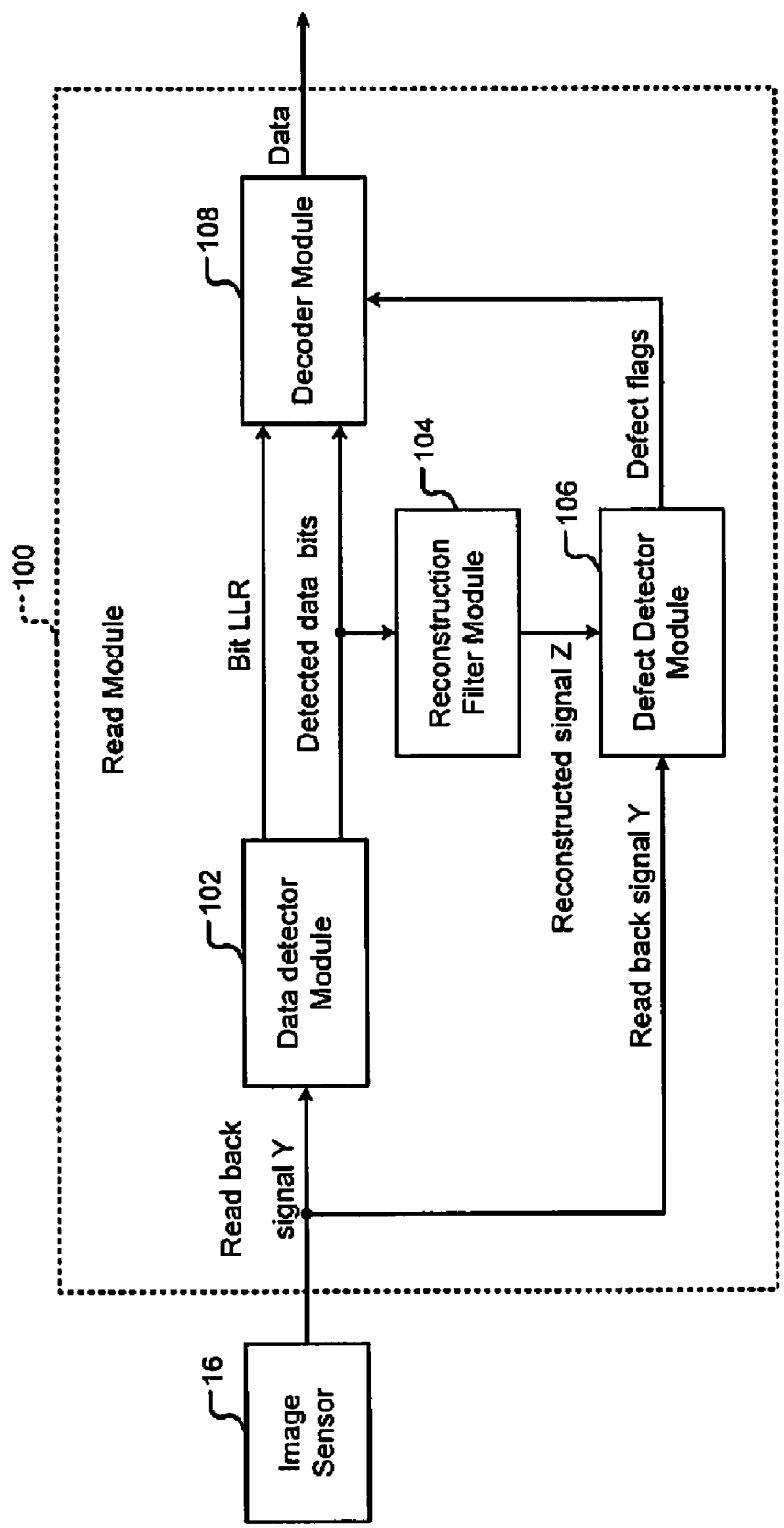
FIG. 2 is a functional block diagram of an exemplary system for detecting errors due to media defects according to the present disclosure.

Referring now to FIG. 2, a read module 100 is shown. The read module 100 detects errors in read back signals caused by media defects. The read module 100 comprises a data detector module 102, a reconstruction filter module 104, a defect detector module 106, and a decoder module 108. The data detector module 102 and the defect detector module 106 receive read back signals generated by the image sensor 16. Data in the read back signals may include errors due to defects in the medium 12.

The data detector module 102 detects data bits in the read back signals and generates detected data bits. The detected data bits may not be correct when the data in the read back signals is corrupt. The reconstruction filter module 104 reconstructs the detected data bits and generates reconstructed signals. The data detector module 102 outputs the reconstructed signals to the defect detector module 106.

The defect detector module 106 detects data bits that may be erroneous in the read back signal. The defect detector module 106 generates defect flags for the detected data bits. The defect flags indicate whether the detected data bits are correct or incorrect. The decoder module 108 receives the detected data bits from the data detector module 102. The decoder module 108 corrects any errors in the detected data bits based on the defect flags for the detected data bits received from the defect detector module 106.

More specifically, the data detector module 102 makes a preliminary determination to determine whether a data bit in the read back signal is a binary 1 or a binary 0. The data detector module 102 may generate a bit decision that includes a hard decision that the data bit is a 1 or a 0. Alternatively, or additionally, the bit decision may include a soft decision in the form of a log-likelihood ratio (LLR). The LLR indicates the reliability of the detected data bit.

For example, a high magnitude of LLR for a detected data bit indicates that the detected data bit is reliably detected as a binary 1 or a binary 0. Conversely, a low magnitude of LLR for a detected data bit indicates that the detected data bit is unreliably detected as a binary 1 or a binary 0. The decoder module 108 decodes the detected data bits partly based on the LLRs. In some implementations, the data detector module 102 may generate the detected data bits without making a hard decision and/or a soft decision.

When the medium 12 has no media defects, the defect detector module 106 may detect an insubstantial difference between a read back signal Y and a reconstructed signal Z. The insubstantial difference may be due to random noise and/or erroneous detection of data bits by the data detection module 102. The insubstantial difference may indicate that the detected data bits correctly represent the data recorded on the medium 12. Accordingly, the defect detector module 106 may generate defect flags for the detected data bits indicating that the detected data bits have no error.

On the other hand, when the medium 12 has media defects, defect detector module 106 may detect a substantial difference between the read back signal Y and the reconstructed signal Z. Accordingly, the defect detector module 106 may generate defect flags for the detected data bits indicating that the detected data bits have errors. The decoder module 108 may decode the detected data bits based on the defect flags generated for the detected data bits.

For example, when the decoder module 108 includes an algebraic decoder for Reed-Solomon code or BCH code, the detected data bits having errors may be marked as erasures and corrected more effectively. Alternatively, when the decoder module 108 includes an iterative decoder for a low-density parity-check (LDPC) code, the LLR inputs may be set to 0 for the detected data bits having errors, which may result in better decoding performance than using generated LLRs.

The defect detector module 106 can be of two types: a second order matched-filter defect detector module or a first order matched-filter defect detector module. A description of each type of defect detector module follows.

Figure 3:
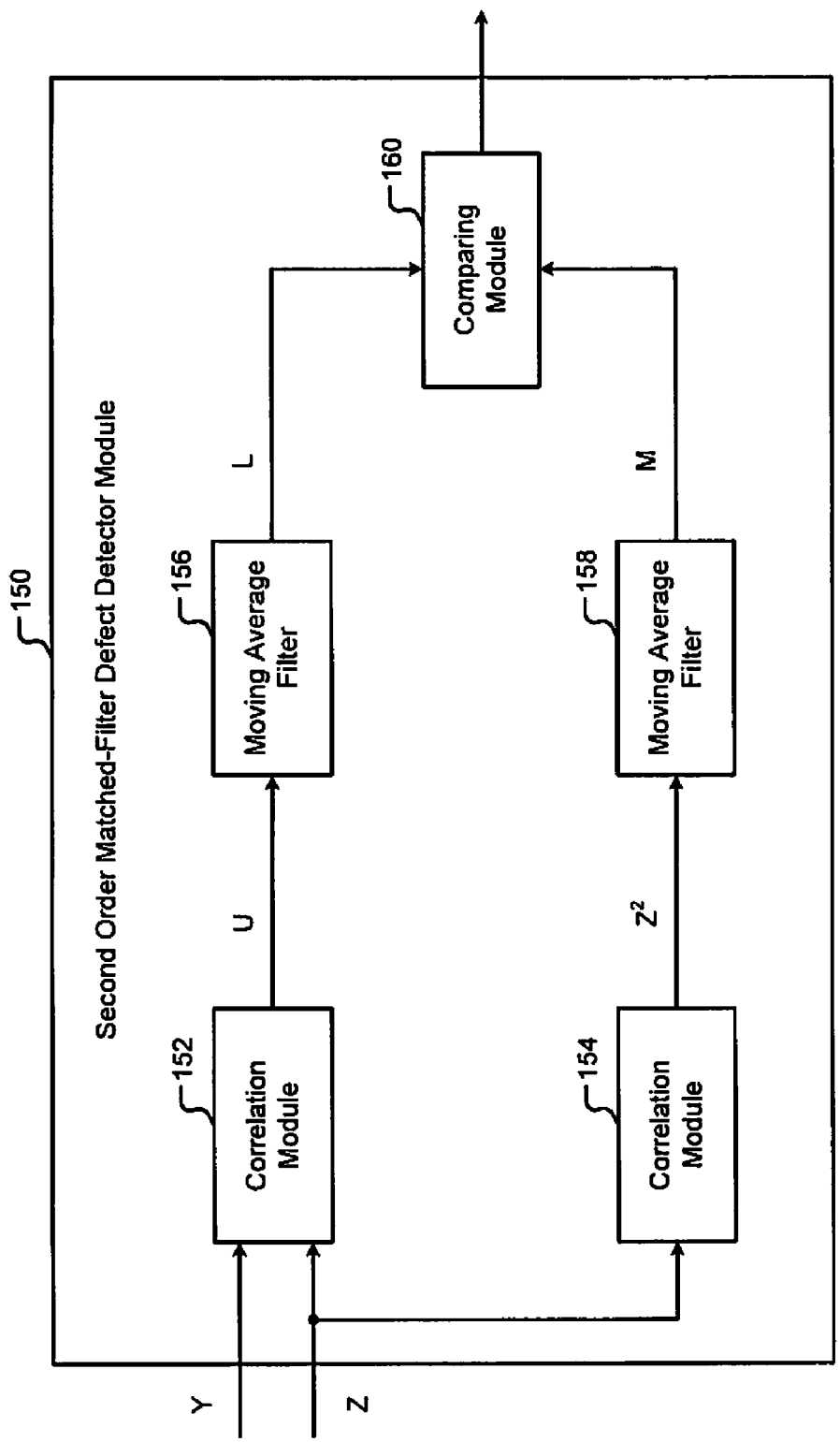
FIG. 3 is a functional block diagram of an exemplary defect detector module according to the present disclosure.

Referring now to FIG. 3, an exemplary second order matched-filter defect detector module 150 (hereinafter defect detector module 150) is shown. The defect detector module 150 comprises correlation modules 152, 154, moving average filters 156, 158, and a comparing module 160. The correlation module 152 correlates the read back signals Y and the reconstructed signals Z and generates correlation values U. The correlation module 154 self-correlates the reconstructed signals Z and generates correlation values $Z^2$.

In some implementations, the correlation modules 152, 154 may be simplified to reduce complexity. For example, when one or both Y and Z are B-bit floating numbers with a sign bit, the correlation modules 152, 154 may use only the first K most significant bits (MSBs) and the sign bit in performing correlation, where $0 \leq K \leq (B-1)$, and B is an integer greater than 1.

The moving average filter 156 generates moving averages L based on the correlation values U. The moving average filter 158 generates moving averages M based on the correlation values $Z^2$. The comparing module 160 compares the moving averages L and M and generates defect flags for the detected data bits. The comparing module 160 sets the defect flag indicating an error in the detected data bit if L is not equal to M (i.e., if L>M or if L<M). The comparing module 160 resets the defect flag indicating no error in the detected data bit if L is substantially equal to M.

More generally, the comparing module 160 may set the defect flag when an absolute value of a difference between L and M is greater than or equal to a predetermined threshold T (i.e., $|L-M|>T$). Otherwise, the comparing module 160 may reset the defect flag.

Figure 4:
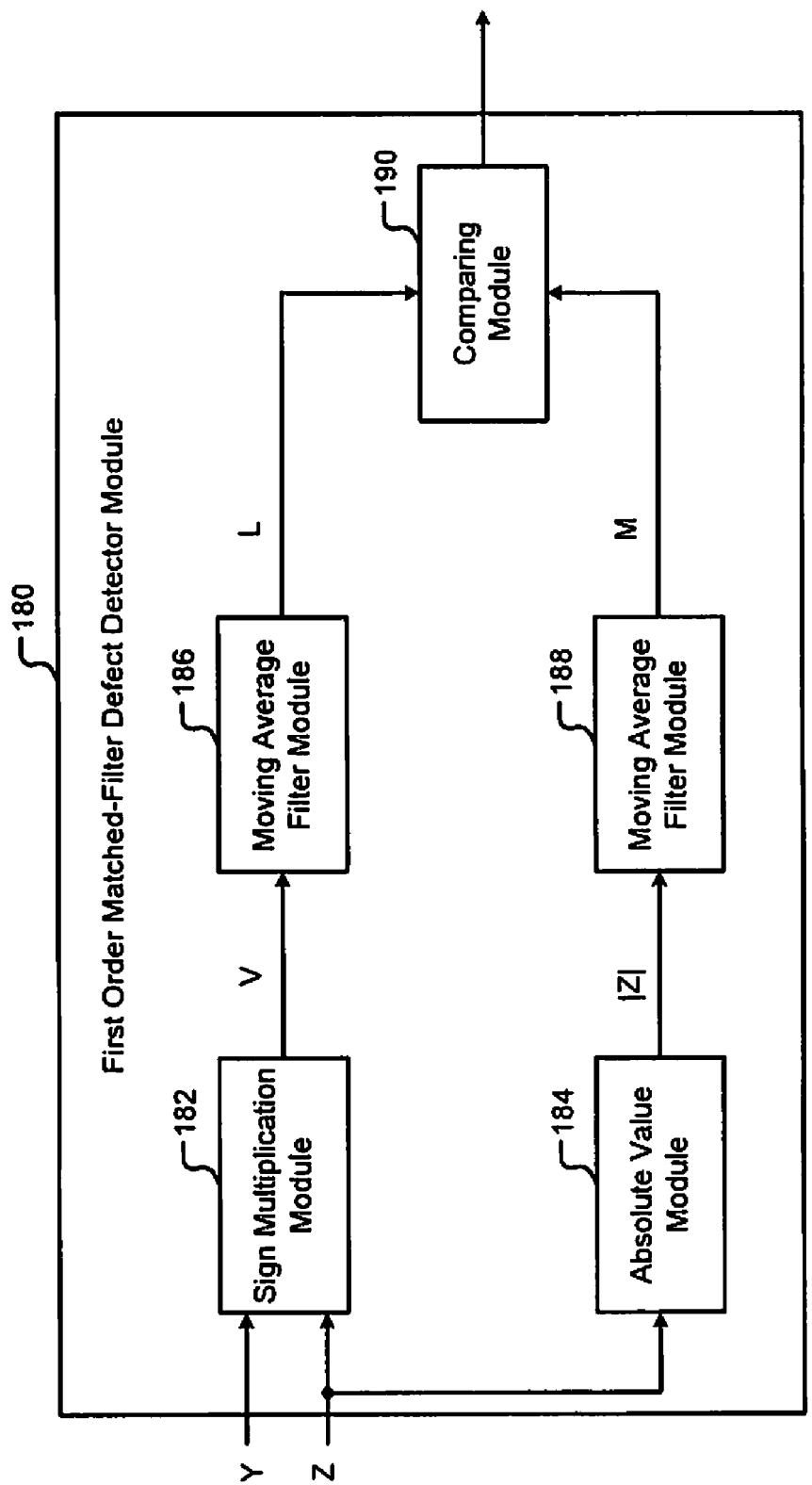
FIG. 4 is a functional block diagram of an exemplary defect detector module according to the present disclosure.

Referring now to FIG. 4, an exemplary first order matched-filter defect detector module 180 (hereinafter defect detector module 180) is shown. The defect detector module 180 comprises a sign multiplication module 182, an absolute value module 184, moving average filters 186, 188, and a comparing module 190. The sign multiplication module 182 multiplies the read back signals Y by signs of the reconstructed signals Z and generates outputs V. Specifically, V=Y when $Z \geq 0$ (positive), and V=(-Y) when Z<0 (negative). The absolute value module 184 generates absolute values |Z| of the reconstructed signals Z.

The moving average filter 186 generates moving averages L based on the outputs V. The moving average filter 188 generates moving averages M based on the absolute values |Z|. The comparing module 190 compares the moving averages L and M and generates defect flags for the detected data bits. The comparing module 190 sets the defect flag indicating an error in the detected data bit if L is not equal to M (i.e., if L>M or if L<M). The comparing module 190 resets the defect flag indicating no error in the detected data bit if L is substantially equal to M.

More generally, the comparing module 190 may set the defect flag when an absolute value of a difference between L and M is greater than or equal to a predetermined threshold T (i.e., $|L-M|>T$). Otherwise, the comparing module 190 may reset the defect flag.

Figure 5:
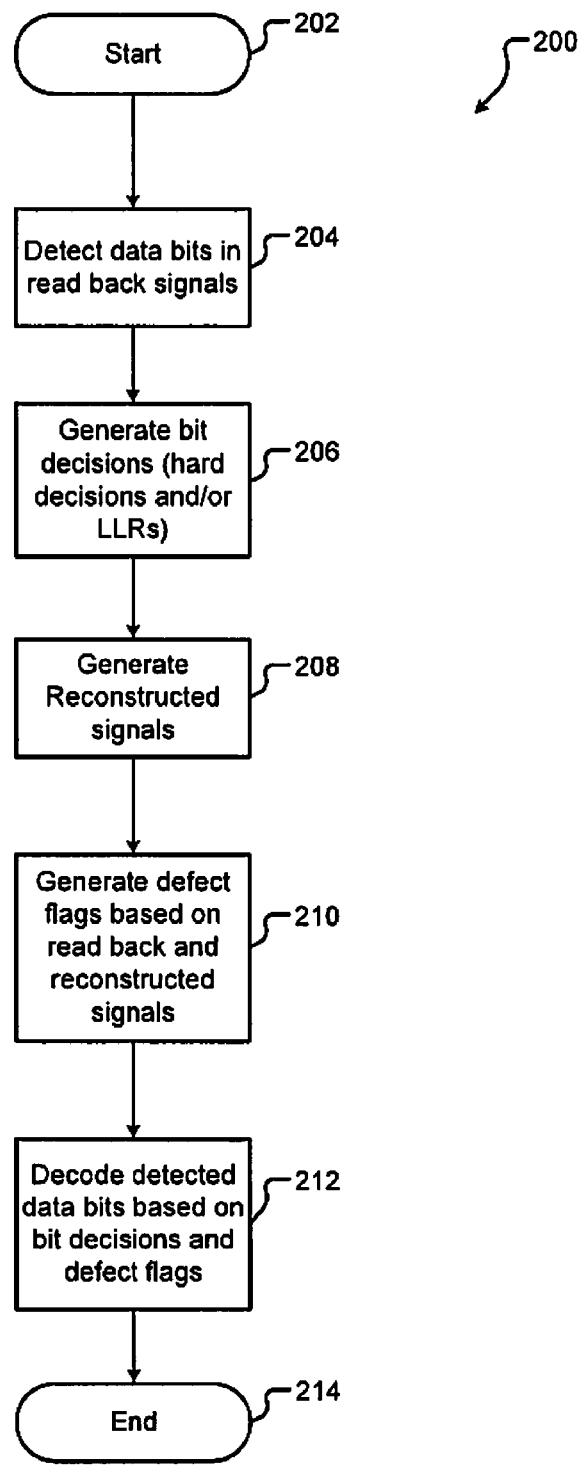
FIG. 5 is a flowchart of an exemplary method for detecting errors due to media defects and decoding data according to the present disclosure.

Referring now to FIG. 5, a method 200 for detecting data errors caused by media defects begins at step 202. The data detector module 102 detects data bits in the read back signals in step 204. In step 206, the data detector module 102 generates bit decisions (i.e., hard decisions and/or soft decisions (LLRs)) for the detected data bits to indicate the reliability of the detected data bits. The reconstruction filter module 104 generates reconstructed signals in step 208 based on the detected data bits. The defect detector module 106 generates defect flags for the detected data bits in step 210 based on the read back and reconstructed signals. The decoder module 108 decodes the detected data bits based on the bit decisions (e.g., LLRs) and the defect flags in step 212. The method 200 ends in step 214.

Figure 6:
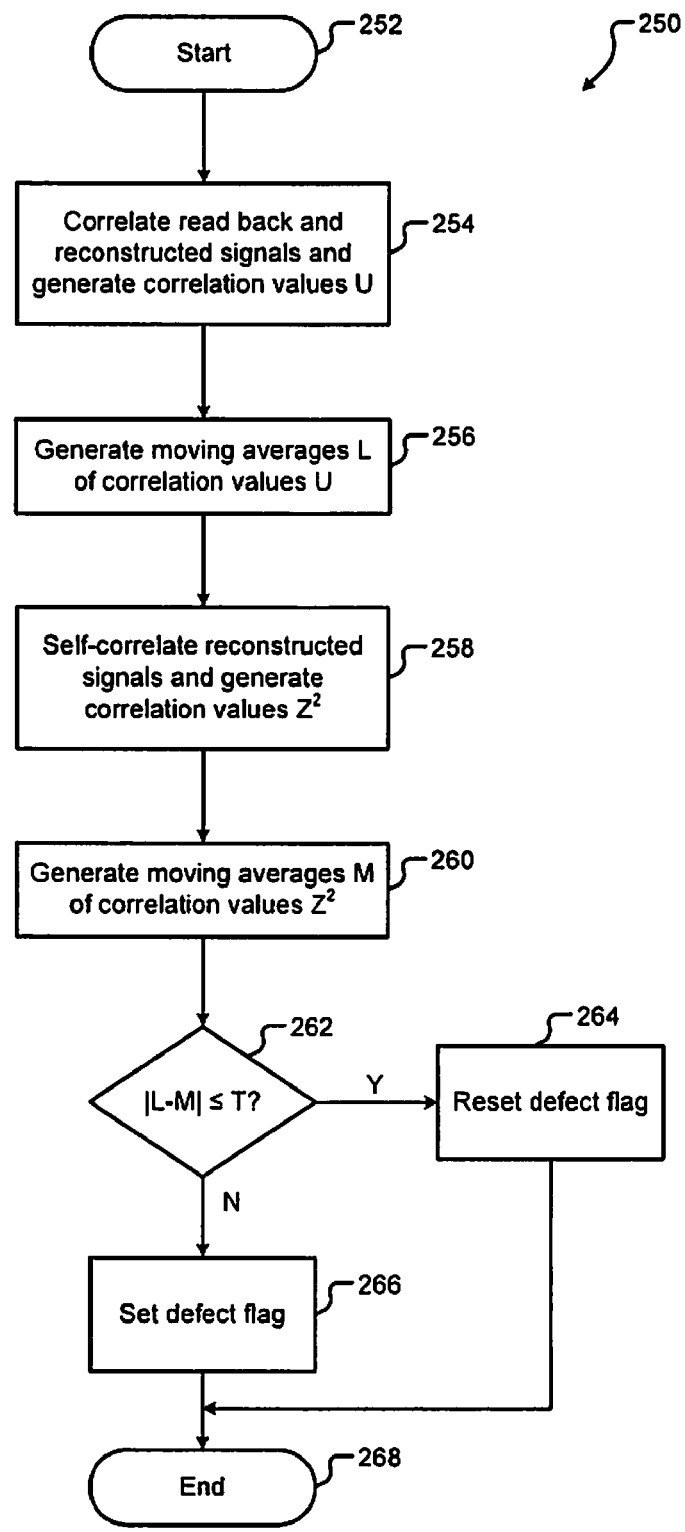
FIG. 6 is a flowchart of an exemplary method for detecting errors due to media defects according to the present disclosure.

Referring now to FIG. 6, a method 250 for generating defect flags begins at step 252. The correlation module 152 correlates the read back signals Y and the reconstructed signals Z and generates correlation values U in step 254. The moving average filter 156 generates moving averages L based on the correlation values U in step 256. The correlation module 154 self-correlates the reconstructed signals Z and generates correlation values $Z^2$ in step 258. The moving average filter 158 generates moving averages M based on the correlation values $Z^2$ in step 260. The comparing module 160 determines whether L is substantially equal to M (or $|L-M| \leq T$) in step 262. If the result of step 262 is true, the comparing module 160 resets the defect flag in step 264. If the result of step 262 is false, the comparing module 160 sets the defect flag in step 266. At the end of steps 264 or 166, the method 250 ends in step 268.

Figure 7:
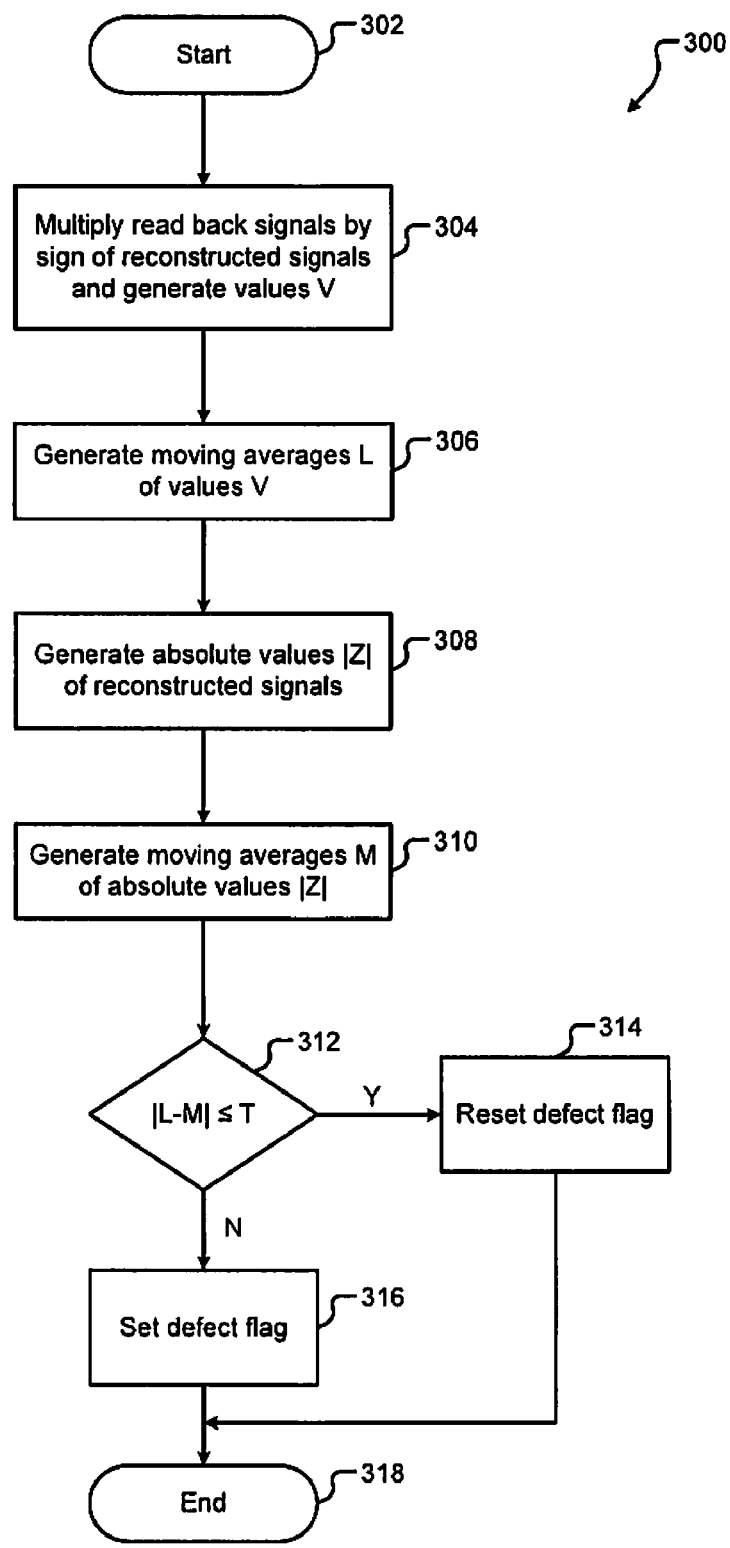
FIG. 7 is a flowchart of an exemplary method for detecting errors due to media defects according to the present disclosure.

Referring now to FIG. 7, a method 300 for generating defect flags begins at step 302. The sign multiplication module 182 multiplies the read back signals Y by the signs of the reconstructed signals Z and generates outputs V in step 304. The moving average filter 186 generates moving averages L based on the outputs V in step 306. The absolute value module 184 generates absolute values |Z| of the reconstructed signals Z in step 308. The moving average filter 188 generates moving averages M based on the absolute values |Z| in step 310. The comparing module 190 determines whether L is substantially equal to M (or $|L-M|\leq T$) in step 312. If the result of step 312 is true, the comparing module 190 resets the defect flag in step 314. If the result of step 312 is false, the comparing module 190 sets the defect flag in step 316. At the end of steps 314 or 316, the method 300 ends in step 318.

The teachings of the present disclosure can be used to detect media defects in a variety of other drives including hard disk drives (HDDs), compact disc (CD) drives, and digital versatile disc (DVD) drives. For example, the systems and methods of the present disclosure can be implemented in read channel devices of HDDs to detect errors in data read from the HDDs due to media defects in the HDDs.

Figure 8A:
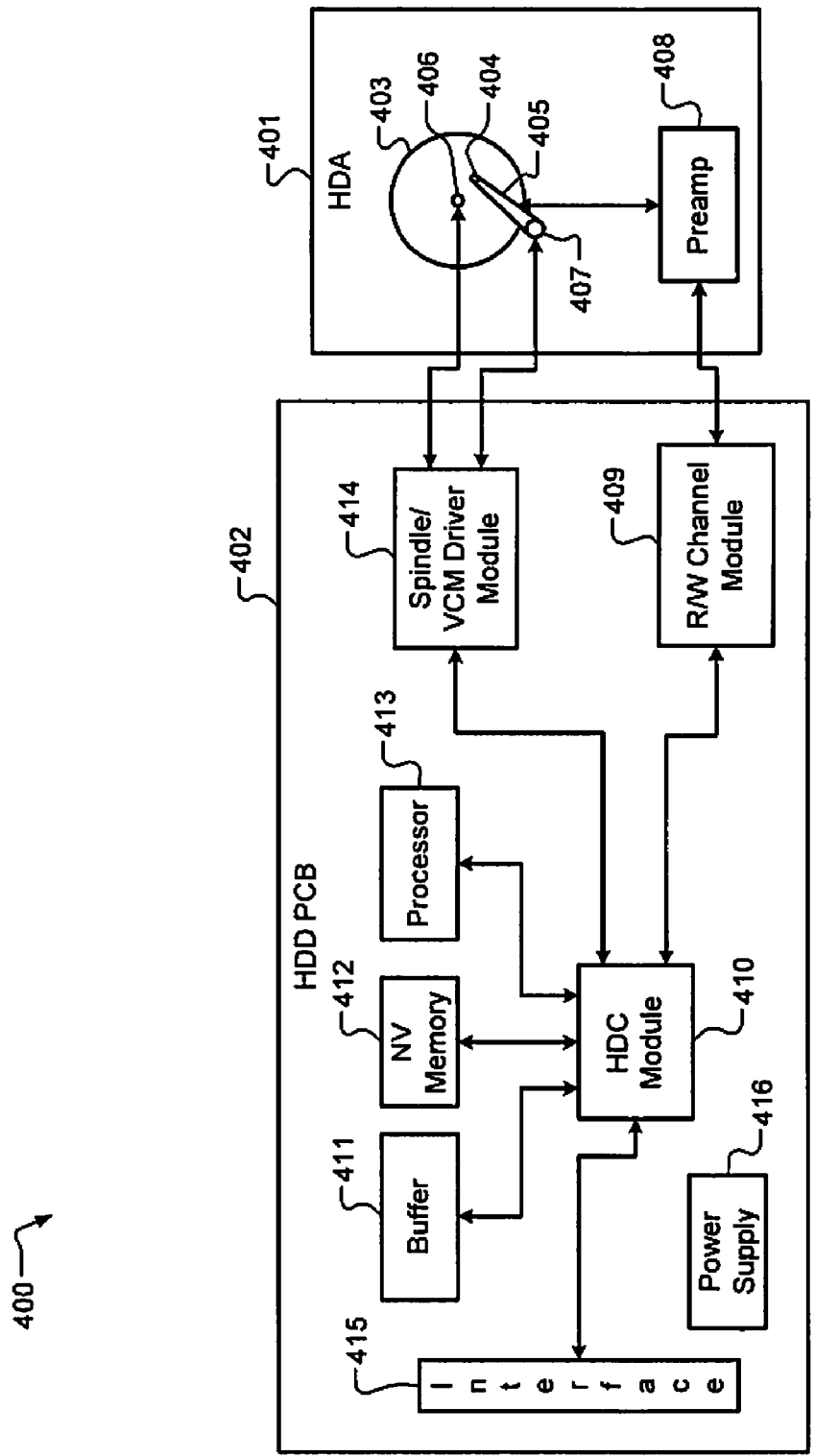
FIG. 8A is a functional block diagram of a hard disk drive.

Referring now to FIGS. 8A-8G, various exemplary implementations incorporating the teachings of the present disclosure are shown. In FIG. 8A, the teachings of the disclosure can be implemented in a read channel 409 of a hard disk drive (HDD) 400. The HDD 400 includes a hard disk assembly (HDA) 401 and an HDD printed circuit board (PCB) 402. The HDA 401 may include a magnetic medium 403, such as one or more platters that store data, and a read/write device 404. The read/write device 404 may be arranged on an actuator arm 405 and may read and write data on the magnetic medium 403. Additionally, the HDA 401 includes a spindle motor 406 that rotates the magnetic medium 403 and a voice-coil motor (VCM) 407 that actuates the actuator arm 405. A preamplifier device 408 amplifies signals generated by the read/write device 404 during read operations and provides signals to the read/write device 404 during write operations.

The HDD PCB 402 includes the read/write channel module (hereinafter, "read channel") 409, a hard disk controller (HDC) module 410, a buffer 411, nonvolatile memory 412, a processor 413, and a spindle/VCM driver module 414. The read channel 409 processes data received from and transmitted to the preamplifier device 408. The HDC module 410 controls components of the HDA 401 and communicates with an external device (not shown) via an I/O interface 415. The external device may include a computer, a multimedia device, a mobile computing device, etc. The I/O interface 415 may include wireline and/or wireless communication links.

The HDC module 410 may receive data from the HDA 401, the read channel 409, the buffer 411, nonvolatile memory 412, the processor 413, the spindle/VCM driver module 414, and/or the I/O interface 415. The processor 413 may process the data, including encoding, decoding, filtering, and/or formatting. The processed data may be output to the HDA 401, the read channel 409, the buffer 411, nonvolatile memory 412, the processor 413, the spindle/VCM driver module 414, and/or the I/O interface 415.

The HDC module 410 may use the buffer 411 and/or nonvolatile memory 412 to store data related to the control and operation of the HDD 400. The buffer 411 may include DRAM, SDRAM, etc. Nonvolatile memory 412 may include any suitable type of semiconductor or solid-state memory, such as flash memory (including NAND and NOR flash memory), phase change memory, magnetic RAM, and multi-state memory, in which each memory cell has more than two states. The spindle/VCM driver module 414 controls the spindle motor 406 and the VCM 407. The HDD PCB 402 includes a power supply 416 that provides power to the components of the HDD 400.

Figure 8B:
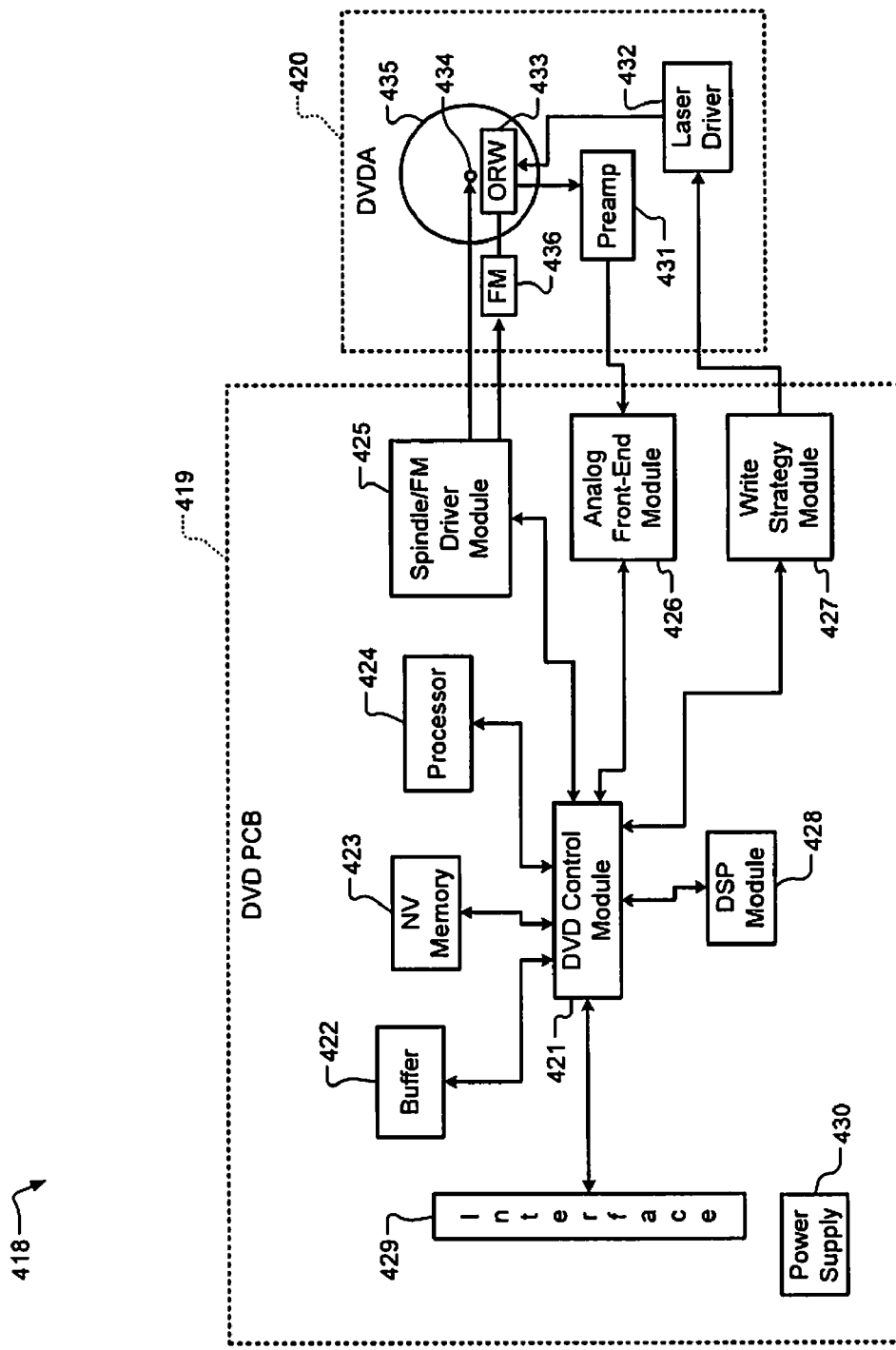
FIG. 8B is a functional block diagram of a DVD drive.

In FIG. 8B, the teachings of the disclosure can be implemented in an analog front-end module 426 or a DSP module 428 of a DVD drive 418 or of a CD drive (not shown). The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, the analog front-end module 426, a write strategy module 427, and the DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. Nonvolatile memory 423 may include any suitable type of semiconductor or solid-state memory, such as flash memory (including NAND and NOR flash memory), phase change memory, magnetic RAM, and multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and ND conversion. To write to the optical storage medium 435, the write strategy module 427 transmits power level and timing data to the laser driver 432. The laser driver 432 controls the optical device 433 to write data to the optical storage medium 435.

Figure 8D:
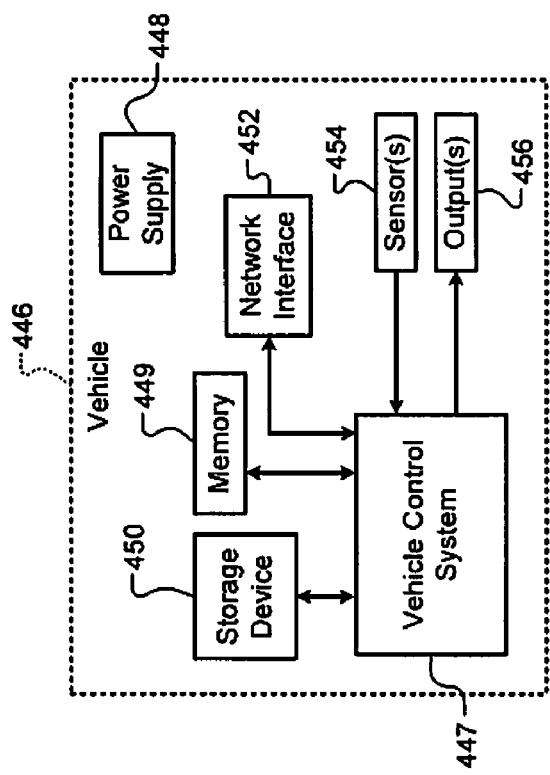
FIG. 8D is a functional block diagram of a vehicle control system.
Figure 8C:
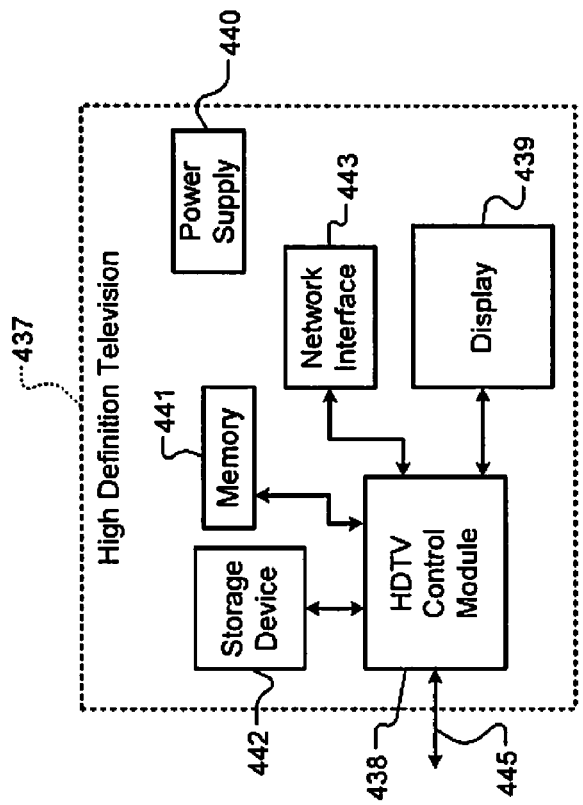
FIG. 8C is a functional block diagram of a high definition television.

In FIG. 8C, the teachings of the disclosure can be implemented in a storage device 442 of a high definition television (HDTV) 437. The HDTV 437 includes an HDTV control module 438, a display 439, a power supply 440, memory 441, the storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 442 may include a holographic storage system, an optical storage drive, such as a DVD drive, and/or a hard disk drive (HDD). The HDTV control module 438 communicates externally via the network interface 443 and/or the external interface 445. The power supply 440 provides power to the components of the HDTV 437.

In FIG. 8D, the teachings of the disclosure may be implemented in a storage device 450 of a vehicle 446. The vehicle 446 may include a vehicle control system 447, a power supply 448, memory 449, the storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 450 may include a holographic storage system, an optical storage drive, such as a DVD drive, and/or a hard disk drive (HDD). The vehicle control system 447 may communicate externally using the network interface 452.

Figure 8F:
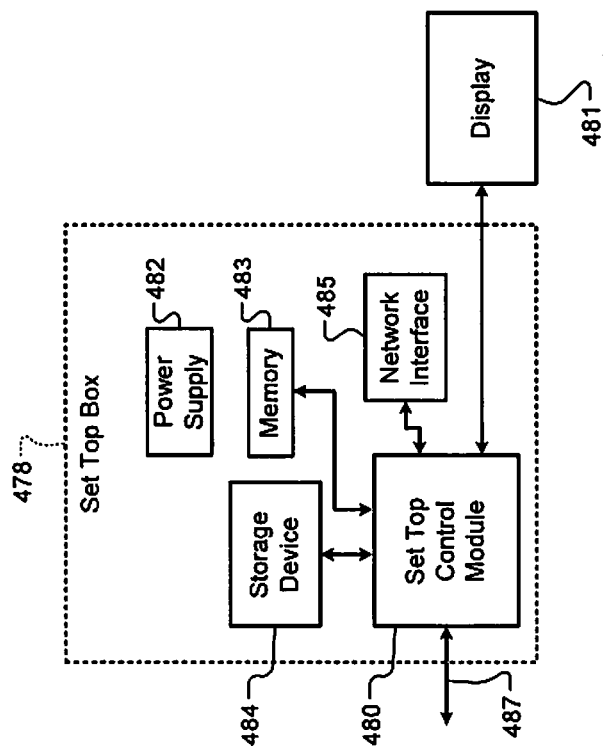
FIG. 8F is a functional block diagram of a set top box.
Figure 8E:
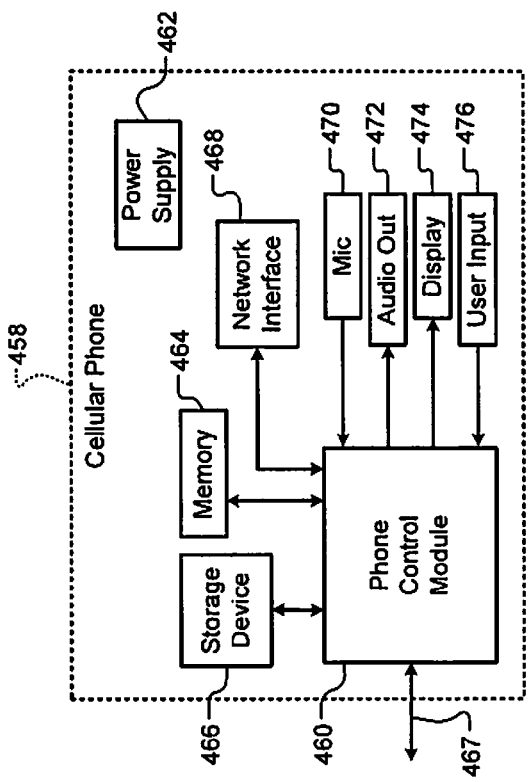
FIG. 8E is a functional block diagram of a cellular phone.

In FIG. 8E, the teachings of the disclosure can be implemented in a storage device 466 of a cellular phone 458. The cellular phone 458 includes a phone control module 460, a power supply 462, memory 464, the storage device 466, and a cellular network interface 467. The cellular phone 458 may include a network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 466 may include a holographic storage system, an optical storage drive, such as a DVD drive, and/or a hard disk drive (HDD). The power supply 462 provides power to the components of the cellular phone 458.

In FIG. 8F, the teachings of the disclosure can be implemented in a storage device 484 of a set top box 478. The set top box 478 includes a set top control module 480, a display 481, a power supply 482, memory 483, the storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include a holographic storage system, an optical storage drive, such as a DVD drive, and/or a hard disk drive (HDD).

Figure 8G:
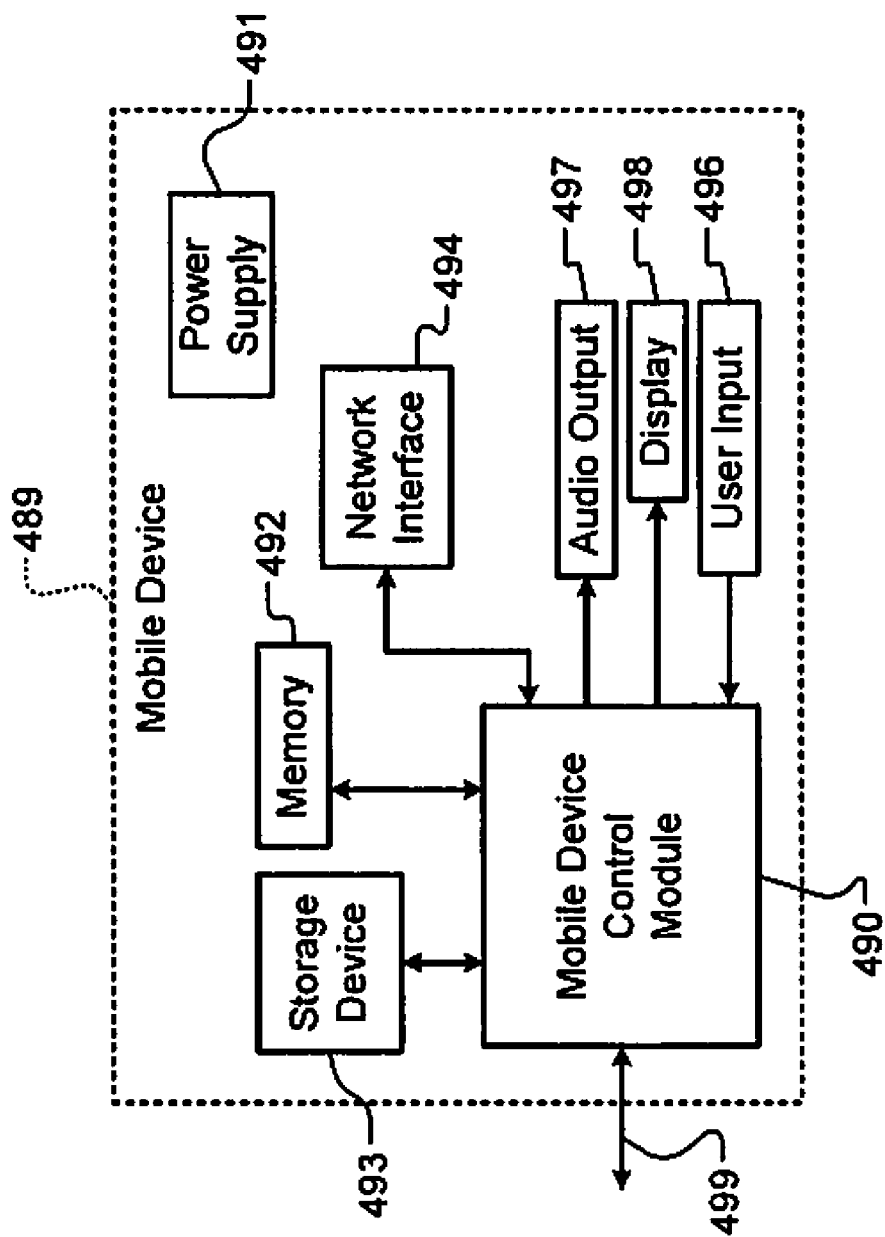
FIG. 8G is a functional block diagram of a mobile device.

In FIG. 8G, the teachings of the disclosure can be implemented in a storage device 493 of a mobile device 489. The mobile device 489 may include a mobile device control module 490, a power supply 491, memory 492, the storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 493 may include a holographic storage system, an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a data detection module configured to
        receive input signals,
        detect data bits from the input signals;
    a reconstruction filter module configured to generate reconstructed signals using the data bits detected from the input signals;
    a first correlation module configured to
        correlate (i) the input signals and (ii) the reconstructed signals, and
        generate first correlation values based on the correlation of (i) the input signals and (ii) the reconstructed signals; and
    a second correlation module configured to self-correlate the reconstructed signals, and
        generate second correlation values based on the self-correlation of the reconstructed signals,
        wherein, in response to at least one of (i) the input signals and (ii) the reconstructed signals including a B-bit floating number having a sign bit, at least one of (i) the first correlation module and (ii) the second correlation module is configured to respectively generate (i) the first correlation values and (ii) the second correlation values based on the sign bit and K most significant bits (MSBs) of the B-bit floating number, wherein 0 K (B-I), and wherein B is an integer greater than 1.

2. The system of claim 1, further comprising:
    a first moving average filter configured to generate first filter values based on the first correlation values;
    a second moving average filter configured to generate second filter values based on the second correlation values; and
    a comparing module configured to
        compare (i) the first filter values and (ii) the second filter values,
        generate first control signals in response to a difference between (i) the first filter values and (ii) the second filter values being less than or equal to a predetermined threshold, and
        generate second control signals in response to the difference being greater than the predetermined threshold.

3. The system of claim 2, further comprising a decoder module configured to decode the data bits detected from the input signals based on at least one of (i) the first control signals and (ii) the second control signals.

4. The system of claim 1, wherein the data detection module is configured to generate log-likelihood ratios (LLRs) that indicate reliability of the data bits detected from the input signals.

5. The system of claim 4, further comprising a decoder module configured to decode the data bits detected from the input signals based on the LLRs.

6. A read module of a holographic storage system, the read module comprising:
    the system of claim 2,
    wherein the read module is configured to receive the input signals from a holographic storage medium, and
    wherein the first control signals and the second control signals indicate errors in the data bits detected from the input signals due to defects of the holographic storage medium.

7. An analog front-end module of a digital versatile disc (DVD) storage system, the analog front-end module comprising:
    the system of claim 2,
    wherein the analog front-end module is configured to receive the input signals from a DVD, and
    wherein the first control signals and the second control signals indicate errors in the data bits detected from the input signals due to defects of the DVD.

8. A digital signal processor (DSP) of a digital versatile disc (DVD) storage system, the DSP comprising:
    the system of claim 2,
    wherein the DSP is configured to receive the input signals from a DVD, and
    wherein the first control signals and the second control signals indicate errors in the data bits detected from the input signals due to defects of the DVD.

9. A read channel of a hard disk drive (HDD), the read channel comprising:
    the system of claim 2,
    wherein the read channel is configured to receive the input signals from a magnetic medium of the HDD, and
    wherein the first control signals and the second control signals indicate errors in the data bits detected from the input signals due to defects of the magnetic medium.

10. A method comprising:
    receiving input signals;
    detecting data bits from the input signals;
    generating reconstructed signals using the data bits detected from the input signals;
    generating first correlation values by correlating the input signals and the reconstructed signals;
    generating second correlation values by self-correlating the reconstructed signals; and
    generating at least one of (i) the first correlation values and (ii) the second correlation values based on a sign bit and K most significant bits (MSBs) of a floating number in response to at least one of (i) the input signals and (ii) the reconstructed signals including the floating number having B bits and the sign bit,
    wherein $0 \leq K \leq (B-1)$, and
    wherein B is an integer greater than 1.

11. The method of claim 10, further comprising:
generating first moving average filter values based on the first correlation values;
generating second moving average filter values based on the second correlation values;
comparing (i) the first moving average filter values and (ii) the second moving average filter values;
generating first control signals in response to a difference between (i) the first moving average filter values and (ii) the second moving average filter values being less than or equal to a predetermined threshold; and
generating second control signals in response to the difference being greater than the predetermined threshold.

12. The method of claim 11, further comprising decoding the data bits detected from the input signals based on at least one of (i) the first control signals and (ii) the second control signals.

13. The method of claim 10, further comprising generating log-likelihood ratios (LLRs) that indicate a reliability of the data bits detected from the input signals.

14. The method of claim 13, further comprising decoding the data bits detected from the input signals based on the LLRs.

15. The method of claim 11, further comprising receiving the input signals from a holographic storage medium, wherein the first control signals and the second control signals indicate errors in the data bits detected from the input signals due to defects of the holographic storage medium.

16. The method of claim 11, further comprising receiving the input signals from a DVD, wherein the first control signals and the second control signals indicate errors in the data bits detected from the input signals due to defects of the DVD.

17. The method of claim 11, further comprising receiving the input signals from a magnetic medium of a hard disk drive (HDD), wherein the control signals indicate errors in the data bits detected from the input signals due to defects of the magnetic medium.

* * * * *